Patented Apr. 3, 1934

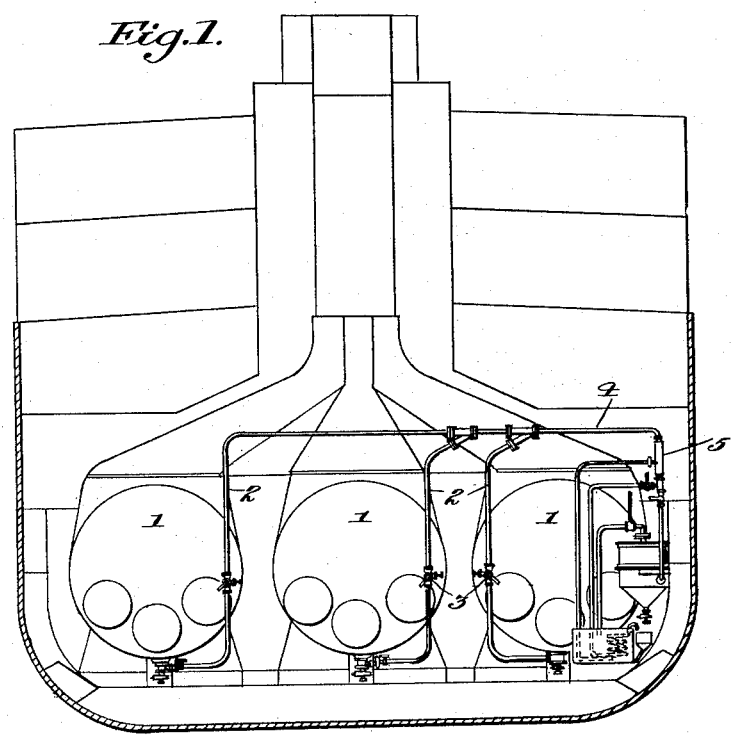

1,953,087

UNITED STATES PATENT OFFICE 1,953,087

MARINE POWER PLANT

Julius Ostertag, Stuttgart, Germany

Application July 7, 1928, Serial No. 291,079
In Poland February 8, 1922

4 Claims. (Cl. 122—398)

My present invention relates to apparatus for purifying feed water for marine boilers. My invention is especially suitable for feed water having a high carbonate hardness, particularly in cases where large quantities of insoluble salts are produced as a result of driving off carbon dioxide from the substances causing carbonate hardness, in addition to any such salts previously present in the unpurified feed water.

Control of the condition of the boiler water in marine boiler practice involves difficulties not met with in stationary boiler operation because of the limited space and the entirely different operating conditions. The present invention contemplates a simple arrangement, occupying little space, for removing scale-forming salts, for preventing concentration of sludge and soluble salts, for maintaining a fixed alkalinity in the boiler water, and for preventing corrosion.

These desirable results are obtained by providing each boiler with a blow down pipe for continuously removing definite quantities of boiler water containing sludge, by adding definite quantities of soda ash to the boiler feed, and by maintaining a proper hydroxide concentration in the boiler water. The heat in the blowoff water is conserved by reducing the pressure to liberate steam, and transferring the heat of the steam and the remaining blow-off water to the feed-water, and, where possible, a large part of the blow-off water is returned to the boilers.

Other desirable features will be apparent from the detailed description following, in conjunction with the appended drawing, wherein:

Fig. 1 is an elevation of a marine installation of the surface condenser type;

Fig. 2 is a view, partly in section, of the details of arrangement;

Referring to Fig. 1, each boiler 1 is provided with a blow-off pipe 2 having a regulating valve 3 provided with a test cock; the pipes 2 lead the blow-off sludge-containing water into a common sludge water carrier pipe 4 which opens into a flash tank 5 under atmospheric pressure.

The blow-off water entering the flash tank at low pressure liberates steam which passes off through steam pipe 6 into hot well 7, and is condensed, thus adding to the condensate from the surface condenser 8.

The remaining sludge water passes to the settling and filter tank 9 through the valve controlled water pipe 10; the velocity of flow is reduced in this relatively large tank, and most of the suspended sludge in the sludge water settles within the conical bottom 11, from whence it is periodically discharged through the valve controlled discharge pipe 12. The remaining particles suspended in the sludge water are retained by the filter 13 as the water passes through it into the pipe 14 leading to the hot well 7. An air vent 15 permits the escape of uncondensed gases.

The hot well 7 thus receives condensate from the surface condenser 8, steam from the flash tank 5, and filtered water from the settling and filter tank 9. In addition, a chemical tank 16 feeds necessary chemicals such as soda ash to the hot well through a valve controlled supply pipe 17.

Where only very hard water is available, or when the condensers are leaking, the rapidly increasing concentration of soluble salts may necessitate the discarding of a portion of the blow-off water. Under such conditions, part of the sludge water from flash tank 5 is removed through valve controlled outlet pipe 18, and is passed into heat exchange relation with the hot well contents through the submerged end of pipe 18 before discharging into the bilge pipe 19.

The water treatment for marine installations thus comprises a continuous predetermined blow-off for maintaining the sludge concentration within desired limits, a soda ash treatment for the feed water to maintain a proper alkalinity of the boiler water, a utilization of the heat of the blow-off water, and, when possible, a return of a large part of the blow-off water to the boiler.

I claim:

1. In a marine installation, a boiler, a condenser, a hot well, means leading condensate from said condenser to said hot well, a low pressure flash tank, a blow-off pipe in open communication with said boiler for continuously leading sludge-containing blow-off water from said boiler to said flash tank, means for passing steam from said flash tank into the water in said hot well for condensing therein, means continuously passing the remaining blow-off water in heat exchange relation to the contents of said hot well, means for adding chemicals to the contents of said hot well, and means for supplying water from said hot well to said boiler.

2. In a marine installation, a boiler, a condenser, a hot well, a low pressure flash tank, a conduit for leading condensate from said condenser to said hot well, a blow off pipe in open communication with said boiler for leading sludge-containing blow-off water from said boiler to said flash tank, a conduit for passing steam from said flash tank into the water of said hot well for condensing therein, and a conduit for continuously passing the remaining blow-off water from said flash tank in heat exchange relation to the water in said hot well.

3. In a marine installation, a boiler, a condenser, a hot well, a low pressure flash tank, a filter, a conduit for leading condensate from said condenser to said hot well, a blow off pipe for leading sludge-containing blow-off water from said boiler to said flash tank, a conduit for leading steam from said flash tank to said hot well for condensing therein, a valve controlled conduit for leading blow-off water from said flash tank in heat exchange relation to the water in said hot well, a valve controlled conduit for leading blow-off water from said flash tank to said filter, and a conduit for leading filtered water from said filter to said hot well.

4. In a continuous purification system for a power plant, a boiler, a condenser, a hot well, means passing condensate from said condenser to said hot well, a low pressure flash tank, a blow-off pipe in open communication with said boiler for continuously passing sludge-containing blow-off water from said boiler to said flash tank, means for passing steam from said flash tank into the water in said hot well for condensing therein, means for continuously passing the remaining blow-off water in heat exchange relation to the contents of said hot well, and means for supplying water from said hot well to said boiler.

JULIUS OSTERTAG.